United States Patent
Dec

(10) Patent No.: US 7,815,542 B2
(45) Date of Patent: Oct. 19, 2010

(54) REVERSE SPROCKET TRANSFER CASE

(75) Inventor: Andrzej Dec, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 279 days.

(21) Appl. No.: 11/888,743

(22) Filed: Aug. 2, 2007

(65) Prior Publication Data
US 2009/0036260 A1 Feb. 5, 2009

(51) Int. Cl.
F16H 3/44 (2006.01)
(52) U.S. Cl. ...... 475/326; 192/69.91; 475/270
(58) Field of Classification Search ............ None
See application file for complete search history.

(56) References Cited

U.S. PATENT DOCUMENTS

| | | | | |
|---|---|---|---|---|
| 3,005,360 A | * | 10/1961 | Carlson | 475/299 |
| 3,217,564 A | * | 11/1965 | Smith | 475/270 |
| 4,083,421 A | * | 4/1978 | Van Horn et al. | 180/369 |
| 4,150,590 A | | 4/1979 | Hurst | 74/780 |
| 4,502,353 A | * | 3/1985 | Beaudoin | 475/298 |
| 4,922,790 A | * | 5/1990 | Abbott et al. | 475/271 |
| 5,435,583 A | | 7/1995 | Foster, Jr. | 280/237 |
| 5,667,233 A | | 9/1997 | Metzinger | 280/238 |
| 5,951,434 A | * | 9/1999 | Richards et al. | 475/284 |
| 6,742,618 B2 | | 6/2004 | Schoenfelder et al. | 180/182 |
| 7,063,639 B2 | | 6/2006 | Schoenfelder et al. | 475/286 |
| 7,311,636 B1 | * | 12/2007 | Regula | 475/326 |
| 2006/0270505 A1 | | 11/2006 | Duitsman et al. | 475/198 |

OTHER PUBLICATIONS

Notification of Transmittal of the International Search Report and the Written Opinion of the International Searching Authority, or the Declaration, International Application No. PCT/US2008/007814 Mailed on Jun. 4, 2009.

* cited by examiner

*Primary Examiner*—David D Le
*Assistant Examiner*—Justin Holmes
(74) *Attorney, Agent, or Firm*—J. A. Thurnau, Esq.; P. N. Dunlap, Esq.

(57) ABSTRACT

A transfer case comprising a rotational input member, a rotational output member, a rotational planetary gear portion operatingly engaged between the input member and the output member, a moveable cam member selectively engagable with the planetary gear portion, whereby the rotation of the planetary gear portion is stopped when the cam member is engaged with the planetary gear portion, the rotational direction of the output member is in the same direction as the input member when the cam member is not engaged with the planetary gear portion, and the rotational direction of the output member is opposite the rotational direction of the input member when the cam member is engaged with the planetary gear portion.

5 Claims, 7 Drawing Sheets

REVERSE SPROCKET TRANSFER CASE

FIELD OF THE INVENTION

The invention relates to a reverse sprocket transfer case having a moveable cam member selectively engagable with a planetary gear portion, whereby the rotation of the planetary gear portion is stopped when the cam member is engaged with the planetary gear portion, thereby reversing the rotational direction of an output member.

BACKGROUND OF THE INVENTION

All terrain vehicles (ATV's) have been known for many years. They comprise an engine and transmission used to propel the vehicle over rough terrain. The engine generally comprises a two stroke or four stroke arrangement with a transmission attached. The transmission is generally similar those used on motorcycles, particularly since the engines are also usually derived from motorcycles.

One drawback for ATV's is the ability to back the vehicle should the need arise. Transmissions are available for this function, however, they can be costly, bulky and complex. Complexity can adversely affect performance and reliability since component failure is often related to the number of moving parts. The size of the reversing transmission can be a limiting factor in vehicle design as well. A large, heavy transmission is not desirable when total vehicle weight is in the range of only 400-500 pounds.

U.S. Pat. No. 6,742,618 (2004) which discloses a reduction drive system including planetary gears. In an alternate embodiment, a reversing unit is provided.

What is needed is a reverse sprocket transfer case having a moveable cam member selectively engagable with a planetary gear portion, whereby the rotation of the planetary gear portion is stopped when the cam member is engaged with the planetary gear portion. The present invention meets this need.

SUMMARY OF THE INVENTION

The primary aspect of the invention is to provide a reverse sprocket transfer case having a moveable cam member selectively engagable with a planetary gear portion, whereby the rotation of the planetary gear portion is stopped when the cam member is engaged with the planetary gear portion.

Other aspects of the invention will be pointed out or made obvious by the following description of the invention and the accompanying drawings.

The invention comprises a transfer case comprising a rotational input member, a rotational output member, a rotational planetary gear portion operatingly engaged between the input member and the output member, a moveable cam member selectively engagable with the planetary gear portion, whereby the rotation of the planetary gear portion is stopped when the cam member is engaged with the planetary gear portion, the rotational direction of the output member is in the same direction as the input member when the cam member is not engaged with the planetary gear portion, and the rotational direction of the output member is opposite the rotational direction of the input member when the cam member is engaged with the planetary gear portion.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
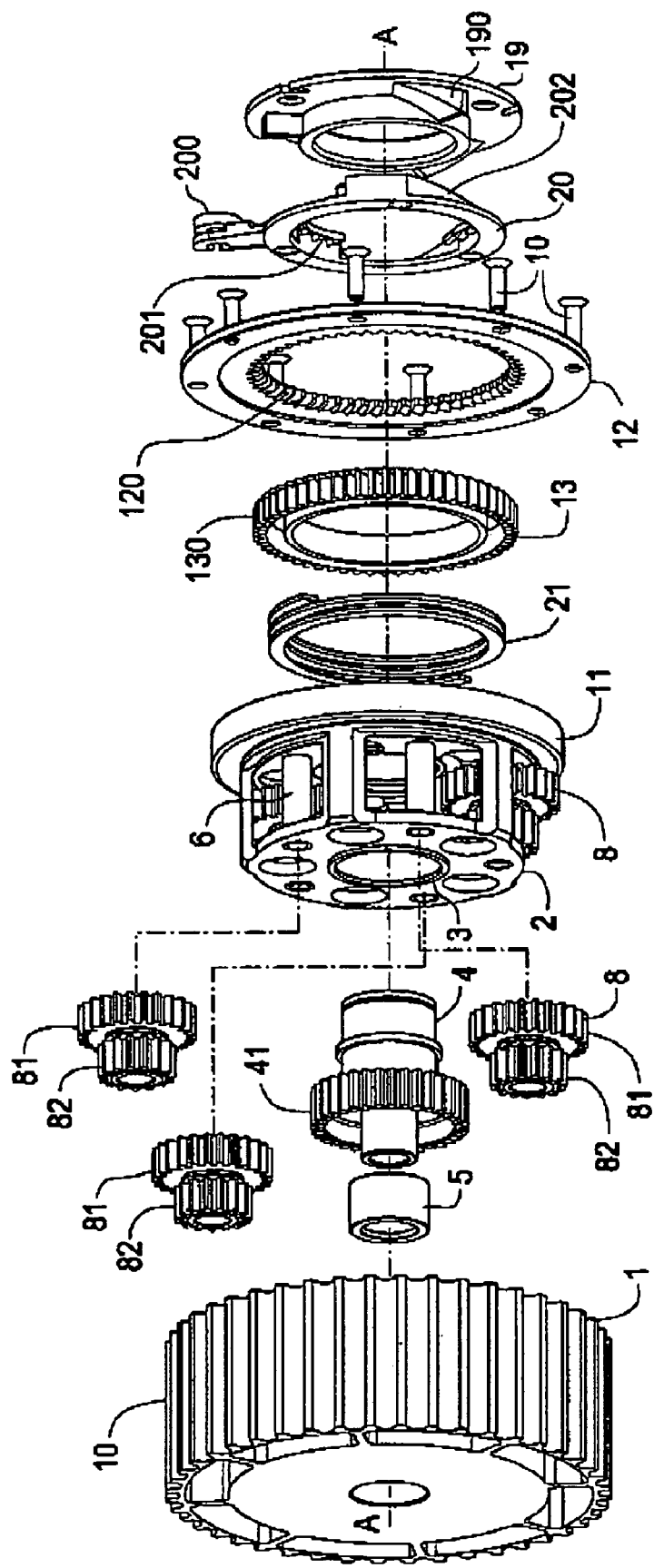
FIG. 1 is a rear perspective exploded view.

FIG. 1 is a rear perspective exploded view. The inventive transfer case 100 comprises sprocket 1. A hub 4 is rotationally engaged with sprocket 1 through needle bearing 5. Hub 4 is rotationally engaged with planetary cage 2 through a ball bearing 16, see FIG. 2. Sprocket surface 10 has a toothed profile for engaging a toothed belt (not shown). Toothed belts are known in the art. Sprocket 1 is typically the input member, although it can function as the output member as well. Hub 4 is typically the output member, although it can function as the input member as well.

Planetary gears 8 are rotatingly engaged with and are disposed in an annular fashion about planetary cage 2. Each planetary gear 8 comprises a gear having a relatively larger first diameter 81 and a relatively smaller second diameter 82. Five planetary gears are used in this embodiment. Gears 82 engage gear 41 on hub 4. Gears 81 engage ring gear 110 on an inner surface of sprocket 1.

Planetary cage 2 and gears 8 comprise the planetary gear portion. Planetary cage 2 is rotationally engaged with sprocket 1 through bearing 11.

Shifter spring 21 is disposed between hub 4 and shift ring 13. Spring 21 urges shift ring 13 into contact with movable cam 20. Shifter spring 21 is a coil spring.

Outer disc 12 is fixedly connected to sprocket 1 using bolts 10. Shift ring gear 130 cooperatively engages gear 120 on outer disc 12.

Cam 20 comprises a ratchet portion 201. Cam 20 also comprises lever 200 which engages an actuator cable (not shown) such as a Bowden cable.

Cam 20 slidingly and rotationally engages bearing plate 19. Camming member 202 cooperatively engages camming body 190.

Figure 2:
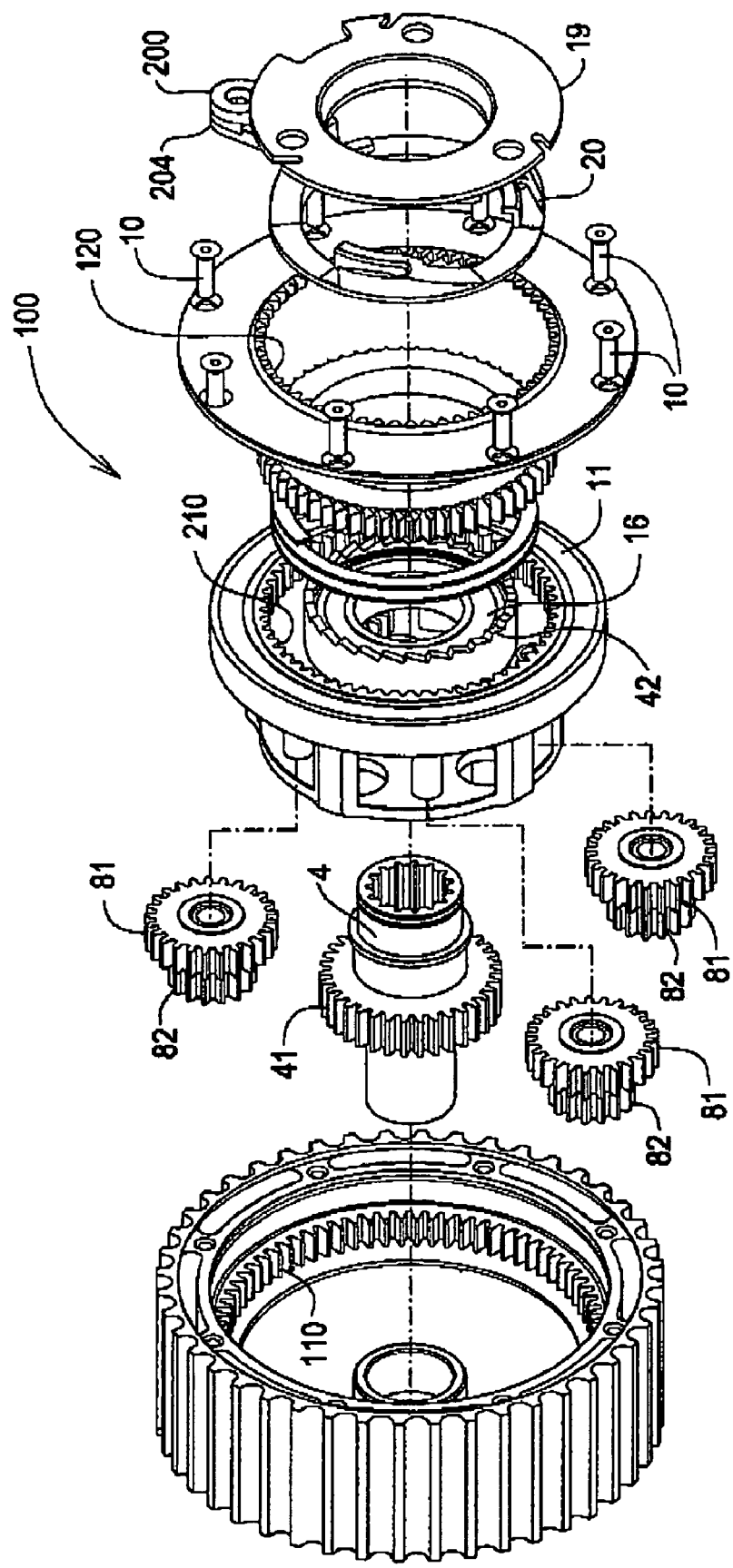
FIG. 2 is a front perspective exploded view.

FIG. 2 is a front perspective exploded view. Ratchet portion 201 cooperatively engages ratchet portion 42 on planetary cage 2. Hub 4 engages planetary cage 2 through bearing 16.

Ring gear 210 is fixedly disposed on an inward surface of planetary cage 2.

Figure 3:
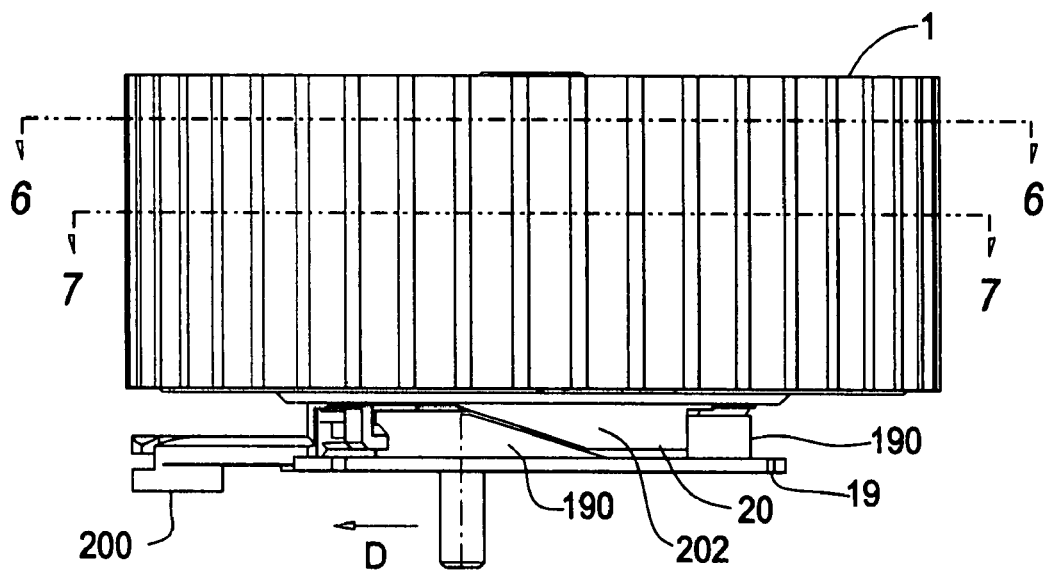
FIG. 3 is a side view.

FIG. 3 is a side view. Camming body 190 slidingly engages camming member 202. Cam 20 rotates through a range of approximately 25° with respect to bearing plate 19 by application of a force to lever 200. FIG. 3 shows cam 20 in the fully retracted position. In operation cam 20 rotationally moves in direction D about the axis of rotation A-A of the transfer case as shown in FIG. 1.

Figure 4:
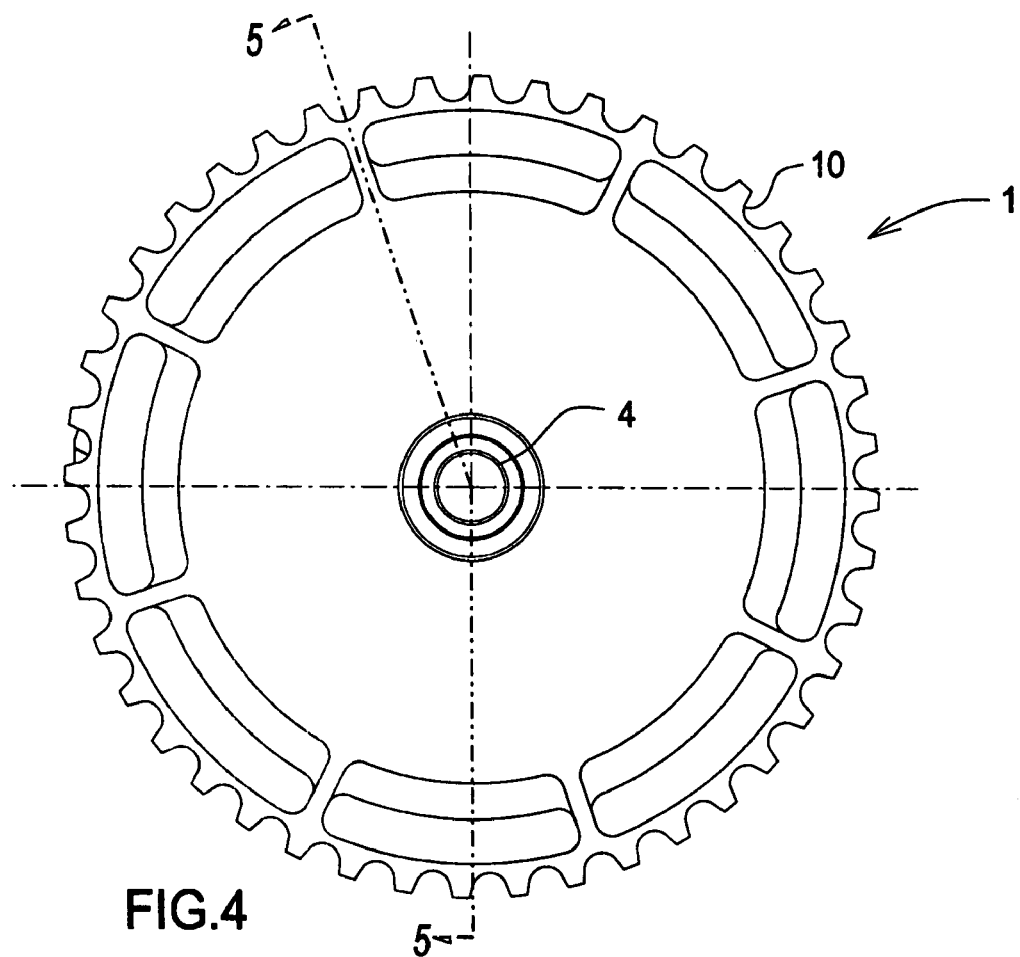
FIG. 4 is a front view.

FIG. 4 is a front view. Toothed surface 10 engages a toothed belt (not shown).

Figure 5:
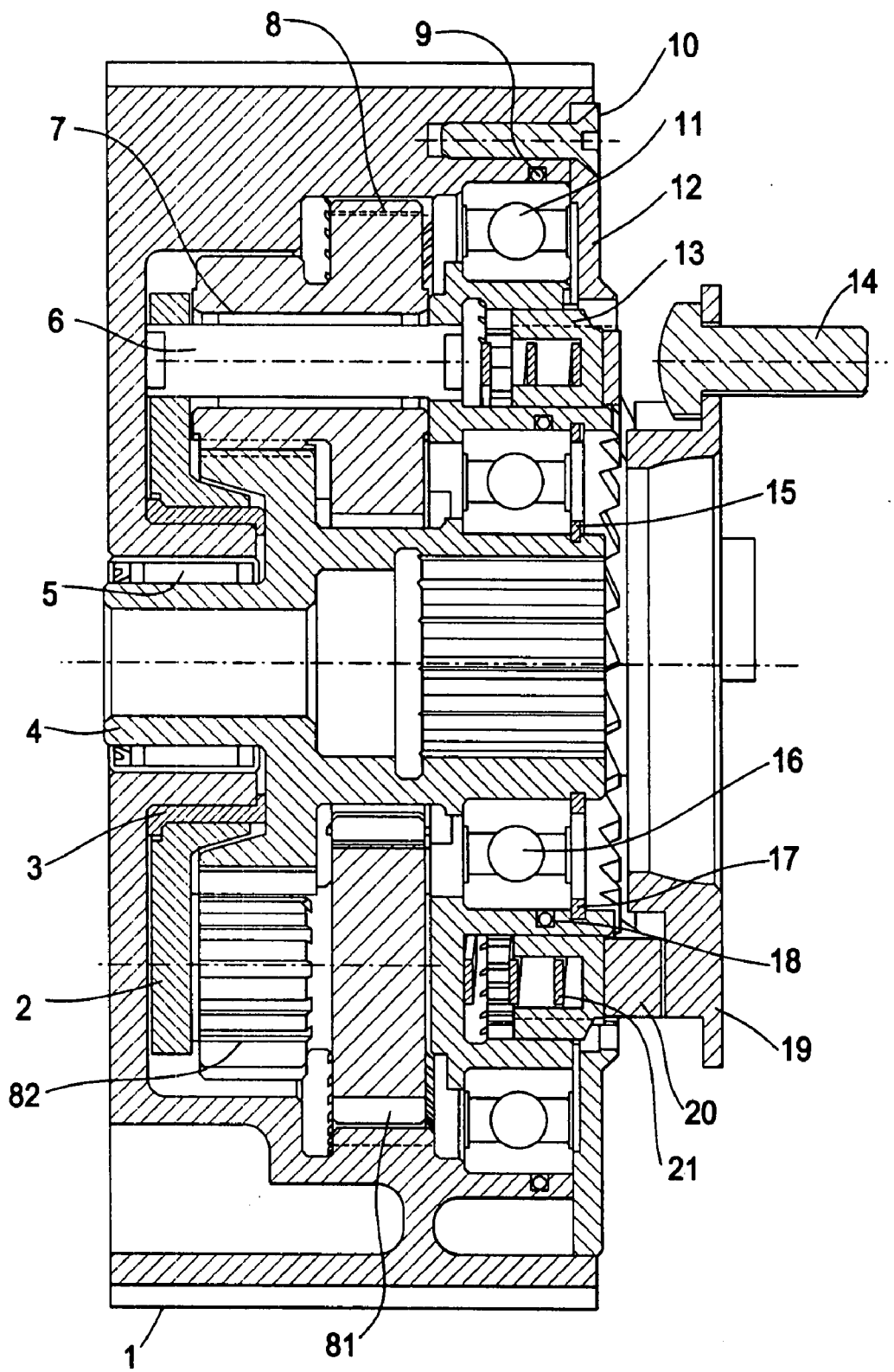
FIG. 5 is section A-A in FIG. 4.

FIG. 5 is section A-A in FIG. 4. Rivets or bolts 14 may be used to connect the bearing plate 19 to a mounting surface such as a vehicle engine (not shown). Bolts 10 connect the outer disc 12 to sprocket 1. Hub 4 connects to an output drive shaft (not shown). The drive shaft may be connected to a vehicle axle.

Figure 6:
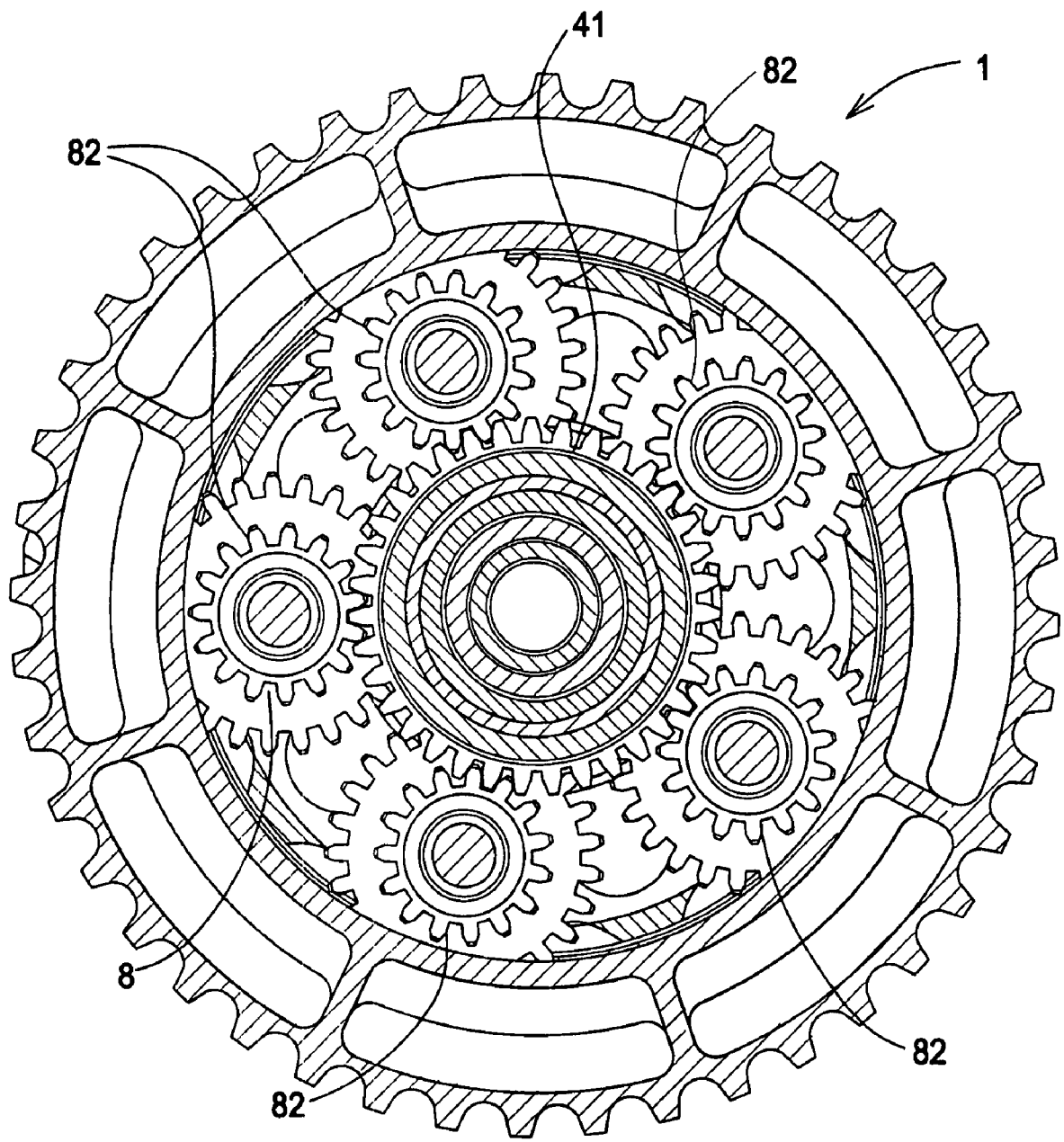
FIG. 6 is section B-B in FIG. 3.

FIG. 6 is section B-B in FIG. 3. Gears 82 engage hub gear 41.

Figure 7:
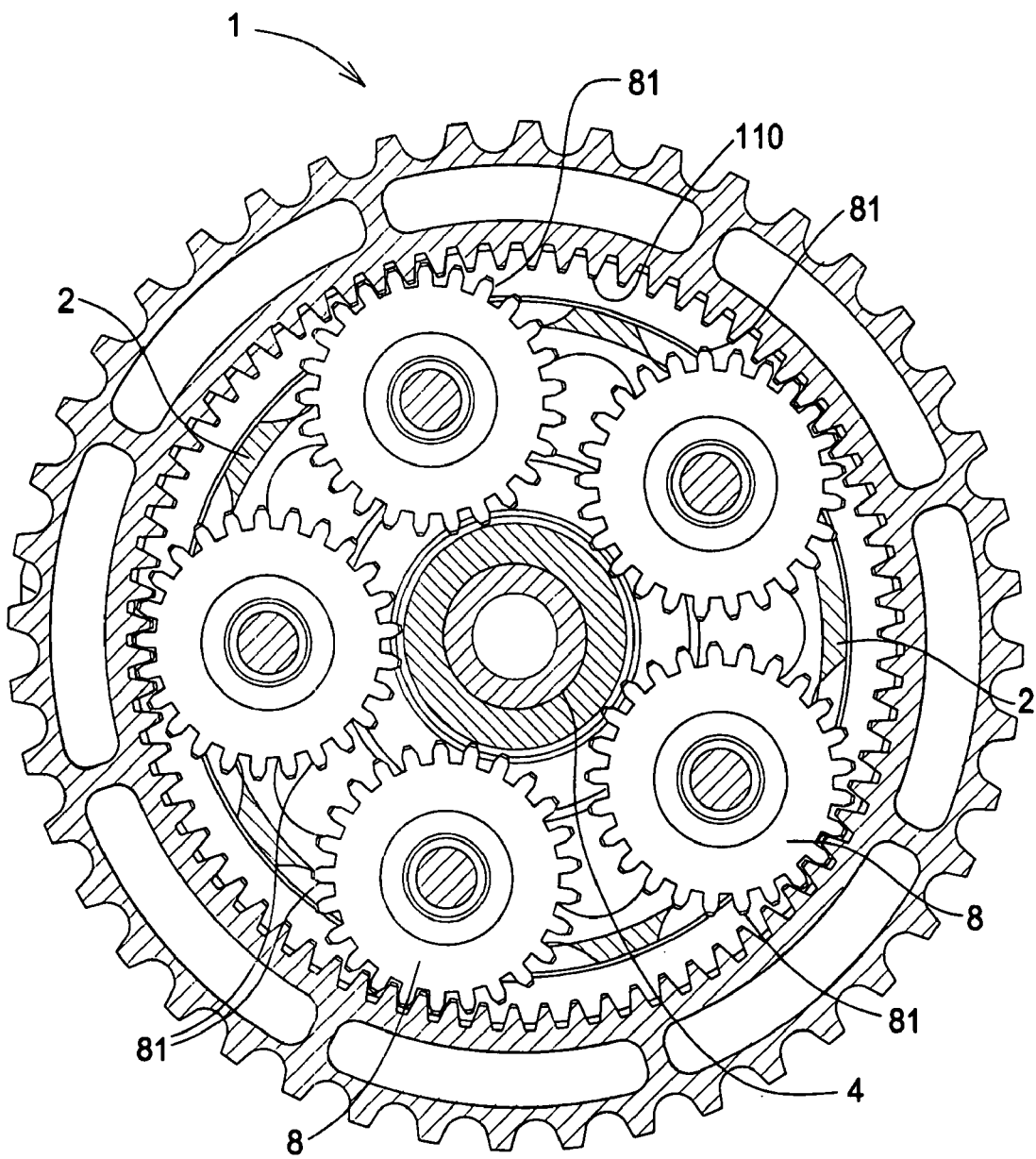
FIG. 7 is section C-C in FIG. 3.

FIG. 7 is section C-C in FIG. 3. Gears 81 engage sprocket ring gear 110.

Figure 8:
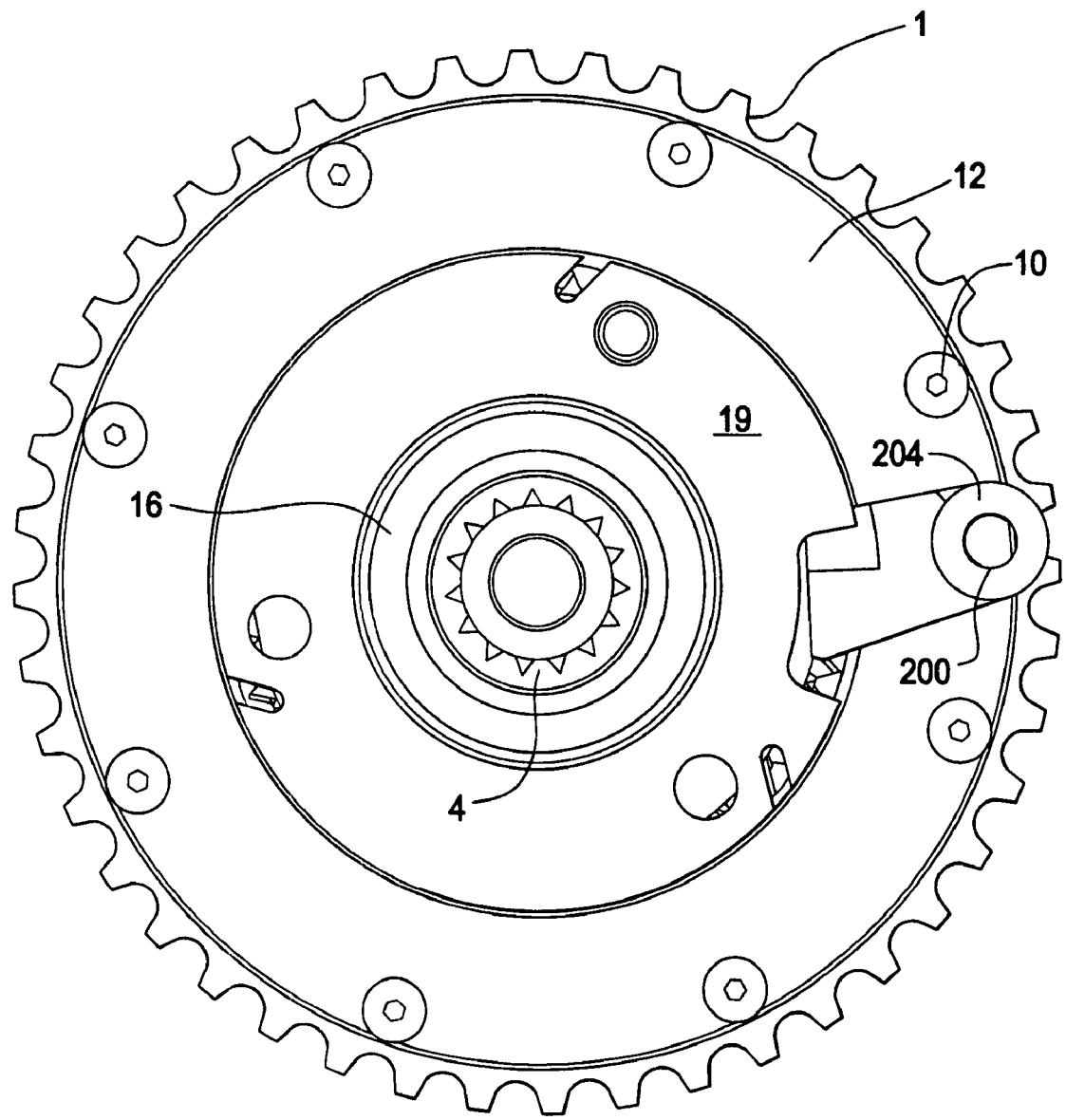
FIG. 8 is a rear view.

FIG. 8 is a rear view. Actuator engaging portion 204 is connected to an actuator by a cable (not shown). Lever 200 moves through an arc of approximately 25° between each position of operation, namely, forward and reverse.

Normal Mode—Forward (Non-reverse).

In normal mode operation a drive shaft (not shown) is connected to hub 4. A belt (not shown) is connected to input member sprocket 1 which transmits a torque to sprocket 1 causing it to rotate.

In this mode cam 20 is retracted meaning that camming member 202 and camming body 190 are in the relative positions shown in FIG. 3. The retracted position of cam 20 allows spring 21 to urge shift ring 13 toward cam 20, causing gear 130 to engage gear 120 of outer disc 12. Gear 130 of shift ring 13 is also simultaneously engaged with ring gear 210. This engagement causes planetary cage 2 to rotate in locked relation with outer disc 12 and sprocket 1. In other words, in this mode sprocket 1, outer disc 12, shift ring 13 and planetary cage 2 comprise and are driven as a single unit because there is no relative rotation between planetary cage 2 and sprocket 1. Since planetary cage 2 rotates in unison with sprocket 1, gears 8 do not rotate relative to ring gear 110. Therefore, gears 8 drive gear 41 and thereby hub 4 at the same rotational speed and direction as sprocket 1. Hence, in the normal mode the planetary cage 2 rotates in unison with the sprocket 1, thereby, the output member hub 4 rotates at the same speed and direction as the input member sprocket 1.

In this Normal mode the drive ratio is 1:1.

Reverse Mode.

In reverse mode cam 20 is actuated, causing it to partially rotate with respect to bearing plate 19. Partial rotation causes camming body 190 and camming member 202 to move relative to each other. Such movement causes cam 20 to move axially away from bearing plate 19, which in turn causes gear 130 to disengage from gear 120. This "breaks" the mechanical driving connection between the planetary cage 2 (gear 210) and the sprocket 1 (gear 120). This also causes ratchet teeth 201 to come into contact with ratchet teeth 42. Since cam 20 only rotates partially through approximately 25° during actuation, this has the overall effect of stopping rotation of planetary cage 2. However, sprocket 1 still rotates because gear 130 and gear 120 are disengaged. The rotation of the planetary gear portion planetary case 2 is stopped when the cam 20 is engaged with the planetary cage 2.

Once planetary cage 2 is stopped from rotating, the engagement of gears 81 and gear 110 cause gears 8 to rotate. Rotation of gears 8 causes gears 82 to rotate, in turn driving hub gear 41. However, hub 4 rotates in the direction opposite the direction of rotation of sprocket 1 due to the fixed position of gears 8. Rotation of hub 4 within stationary planetary cage 2 is made possible by bearing 5 and bearing 16.

In the reverse mode the drive ratio between the input member (sprocket 1) and the output member (hub 4) is approximately 1.28:1. This is because if, for example, gear 8 comprised only one gear then hub 4 would speed up when in reverse. The increase of speed would equal the ratio between the number of teeth of the sprocket gear 110, and the hub gear 41, which in this case, for example, is 75:35 (2.14:1). A single-gear planetary gear (8) would only be a torque transmitting/reversing medium, consequently its number of teeth would play no role in this ratio. However, since gear 8 has a larger diameter gear 81 and a smaller diameter gear 82, and each is engaged with gear 110 and gear 41 respectively, this reduces the transmitted speed by the gear ratio of:

(# of teeth in gear 81):(# of teeth in gear 82)

which in this case by way of example is:

15:25=0.6.

Consequently the total speed change/increase in reverse mode between input sprocket 1 and output hub 4 is:

2.14×0.6=1.28.

This means the overall drive ratio in reverse mode is 1.28:1. The inventive device achieves reverse operation without significant change to the output speed in reverse as compared to the output speed in forward. This minimizes speed surges that might otherwise be caused by small throttle inputs using other transmissions with larger ratios.

The drive ratio may be adjusted depending upon the relative diameters of gears 81 and 82.

The input member and output members may also be reversed so that the input member is now hub 4 and the output member is now sprocket 1 with equal operating success.

Although forms of the invention has been described herein, it will be obvious to those skilled in the art that variations may be made in the construction and relation of parts and method without departing from the spirit and scope of the invention described herein.

I claim:

1. A transfer case comprising:
   a rotational input member;
   a rotational output member;
   a rotational planetary gear portion mechanically engaged between the input member and the output member;
   a moveable cam member having an axis concentrically rotatable on the output member axis of rotation and selectively engagable with the planetary gear portion, whereby the rotation of the planetary gear portion is stopped when the cam member is engaged with the planetary gear portion;
   a gear for selectively engaging the planetary gear portion with the output member whereby the planetary gear portion and the output member are rotatable in locked relation;
   a spring in contact with the gear for urging the gear into contact with the cam member;
   the rotational direction of the output member is in the same direction as the input member when the cam member is not engaged with the planetary gear portion; and
   the rotational direction of the output member is opposite the rotational direction of the input member when the cam member is engaged with the planetary gear portion.

2. The transfer case as in claim 1, wherein a cam member ratchet portion engages a ratchet portion of the planetary gear portion.

3. The transfer case as in claim 1, wherein an output drive ratio between the input member and the output member is approximately the same for either forward mode or reverse mode.

4. The transfer case as in claim 1, wherein the rotation of the planetary gear portion is stopped when the cam member is engaged with the planetary gear portion.

5. The transfer case as in claim 1, wherein the cam member further comprises a cam member ratchet portion engagable with a planetary gear ratchet portion for stopping rotation of the planetary gear portion when the cam member ratchet portion is engaged with the planetary gear ratchet portion.

* * * * *